United States Patent
Giebels

(10) Patent No.: US 8,306,645 B2
(45) Date of Patent: Nov. 6, 2012

(54) METHOD FOR UPDATING MANUFACTURING PLANNING DATA FOR A PRODUCTION PROCESS

(75) Inventor: Mark Mathieu Theodorus Giebels, Wageningen (NL)

(73) Assignee: Siemens Aktiengesellschaft, Munich (DE)

( * ) Notice: Subject to any disclaimer, the term of this patent is extended or adjusted under 35 U.S.C. 154(b) by 534 days.

(21) Appl. No.: 12/553,685

(22) Filed: Sep. 3, 2009

(65) Prior Publication Data

US 2010/0057240 A1   Mar. 4, 2010

(30) Foreign Application Priority Data

Sep. 4, 2008  (EP) .................................. 08015596

(51) Int. Cl.
B30B 9/02 (2006.01)

(52) U.S. Cl. ............ 700/105; 700/104; 700/47; 700/51; 700/45; 700/174

(58) Field of Classification Search .......... 700/103–105, 700/47, 49, 51, 97, 44, 45, 174
See application file for complete search history.

(56) References Cited

U.S. PATENT DOCUMENTS

| | | | | |
|---|---|---|---|---|
| 5,260,866 | A * | 11/1993 | Lisinski et al. | 700/97 |
| 5,339,257 | A * | 8/1994 | Layden et al. | 700/174 |
| 5,444,632 | A | 8/1995 | Kline et al. | |
| 5,819,408 | A * | 10/1998 | Catlin | 29/897.2 |
| 5,963,447 | A * | 10/1999 | Kohn et al. | 700/49 |
| 6,141,647 | A * | 10/2000 | Meijer et al. | 700/106 |
| 6,243,611 | B1 * | 6/2001 | Hazama et al. | 700/97 |
| 6,442,441 | B1 * | 8/2002 | Walacavage et al. | 700/86 |
| 6,546,364 | B1 | 4/2003 | Smirnov et al. | |
| 6,738,682 | B1 | 5/2004 | Pasadyn | |
| 6,748,283 | B2 * | 6/2004 | Walacavage et al. | 700/96 |
| 6,819,967 | B2 * | 11/2004 | Ballas et al. | 700/107 |
| 6,853,920 | B2 * | 2/2005 | Hsiung et al. | 700/49 |
| 6,917,845 | B2 * | 7/2005 | Hsiung et al. | 700/104 |
| 7,013,193 | B2 * | 3/2006 | Hoppes et al. | 700/103 |
| 7,031,778 | B2 * | 4/2006 | Hsiung et al. | 700/29 |
| 7,110,850 | B2 * | 9/2006 | Becker et al. | 700/174 |

(Continued)

FOREIGN PATENT DOCUMENTS

EP   0420476 A2   4/1991

(Continued)

*Primary Examiner* — Mohammad Ali
*Assistant Examiner* — Kelvin Booker
(74) *Attorney, Agent, or Firm* — Laurence A. Greenberg; Werner H. Stemer; Ralph E. Locher

(57) ABSTRACT

Manufacturing planning data for a production process that is managed by a manufacturing execution system is updated by way of a plurality of steps, which include: Gathering data from a PLC level relevant to the manufacturing planning data and the execution of the production process; mapping the gathered data with the current manufacturing planning data in order to determine suggested changes between the gathered data and the current manufacturing planning data; applying a predetermined update scenario for the manufacturing planning data depending on the suggested changes to update the manufacturing planning data; and adapting the current production process and optionally following production processes according to the updated manufacturing planning data. The reliability of the so-called standard data used in production planning processes is thus dramatically improved. Furthermore, since trends on possible deviations from the standard data can be recognized in real-time, it is now possible to dynamically update the standard data as soon as accompanying quality improvement programs reach those performance results which are significant for the current production plan based on the production planning data.

7 Claims, 6 Drawing Sheets

U.S. PATENT DOCUMENTS

| | | | |
|---|---|---|---|
| 7,136,716 B2 * | 11/2006 | Hsiung et al. | 700/104 |
| 7,206,646 B2 * | 4/2007 | Nixon et al. | 700/83 |
| 7,221,988 B2 * | 5/2007 | Eryurek et al. | 700/108 |
| 7,233,830 B1 * | 6/2007 | Callaghan et al. | 700/49 |
| 7,242,995 B1 * | 7/2007 | Morgenson et al. | 700/103 |
| 7,308,327 B2 * | 12/2007 | Coburn et al. | 700/97 |
| 7,313,453 B2 * | 12/2007 | Kline, Jr. | 700/103 |
| 7,346,478 B2 * | 3/2008 | Walacavage et al. | 700/105 |
| 7,376,478 B2 * | 5/2008 | Hurley et al. | 700/97 |
| 7,437,205 B2 * | 10/2008 | Knipfer et al. | 700/106 |
| 7,557,702 B2 * | 7/2009 | Eryurek et al. | 340/511 |
| 7,571,019 B2 * | 8/2009 | Winstead et al. | 700/100 |
| 7,580,769 B2 * | 8/2009 | Bowman et al. | 700/179 |
| 7,610,112 B2 * | 10/2009 | Knipfer et al. | 700/106 |
| 7,693,581 B2 * | 4/2010 | Callaghan et al. | 700/49 |
| 7,693,593 B2 * | 4/2010 | Ishibashi et al. | 700/97 |
| 7,894,922 B2 * | 2/2011 | Steinbach et al. | 700/97 |
| 7,904,181 B2 * | 3/2011 | Aupperlee et al. | 700/174 |
| 7,912,561 B2 * | 3/2011 | Hsiung et al. | 700/29 |
| 2002/0002414 A1 * | 1/2002 | Hsiung et al. | 700/95 |
| 2002/0077711 A1 * | 6/2002 | Nixon et al. | 700/51 |
| 2003/0018405 A1 * | 1/2003 | Walacavage et al. | 700/105 |
| 2003/0028276 A1 * | 2/2003 | Adair et al. | 700/99 |
| 2003/0109951 A1 * | 6/2003 | Hsiung et al. | 700/108 |
| 2003/0144746 A1 * | 7/2003 | Hsiung et al. | 700/28 |
| 2004/0019604 A1 * | 1/2004 | Ballas et al. | 700/97 |
| 2005/0007249 A1 * | 1/2005 | Eryurek et al. | 340/511 |
| 2005/0096774 A1 | 5/2005 | Bayoumi et al. | |
| 2005/0216114 A1 * | 9/2005 | Hsiung et al. | 700/108 |
| 2006/0074505 A1 * | 4/2006 | Kline, Jr. | 700/96 |
| 2006/0149407 A1 * | 7/2006 | Markham et al. | 700/108 |
| 2006/0190112 A1 * | 8/2006 | Buesgen et al. | 700/97 |
| 2006/0191993 A1 * | 8/2006 | Markham et al. | 235/376 |
| 2007/0050070 A1 * | 3/2007 | Strain et al. | 700/99 |
| 2007/0156272 A1 * | 7/2007 | Winstead et al. | 700/97 |
| 2007/0225845 A1 * | 9/2007 | Hurley et al. | 700/97 |
| 2007/0265721 A1 * | 11/2007 | Coburn et al. | 700/97 |
| 2008/0051923 A1 * | 2/2008 | Knipfer et al. | 700/105 |
| 2008/0097636 A1 * | 4/2008 | Kline, Jr. | 700/103 |
| 2008/0140244 A1 * | 6/2008 | Roumeliotis et al. | 700/104 |
| 2009/0069919 A1 * | 3/2009 | Erickson et al. | 700/97 |
| 2009/0069921 A1 * | 3/2009 | Balzer et al. | 700/97 |
| 2009/0089027 A1 * | 4/2009 | Sturrock et al. | 703/6 |
| 2009/0089032 A1 * | 4/2009 | Sturrock et al. | 703/7 |
| 2009/0089227 A1 * | 4/2009 | Sturrock et al. | 706/12 |
| 2009/0089709 A1 * | 4/2009 | Baier et al. | 715/817 |
| 2009/0198350 A1 * | 8/2009 | Thiele | 700/30 |
| 2009/0222123 A1 * | 9/2009 | Nevills et al. | 700/104 |
| 2010/0082132 A1 * | 4/2010 | Marruchella et al. | 700/86 |
| 2010/0138026 A1 * | 6/2010 | Kaushal et al. | 700/104 |
| 2012/0041574 A1 * | 2/2012 | Hsiung et al. | 700/47 |

FOREIGN PATENT DOCUMENTS

| | | |
|---|---|---|
| EP | 0679972 A1 | 11/1995 |
| EP | 2161637 A1 * | 3/2010 |
| WO | 0038091 A1 | 6/2000 |
| WO | 03023538 A2 | 3/2003 |
| WO | 2007017738 A2 | 2/2007 |

* cited by examiner

FIG. 2

| Resource: | Assembly Area | Process Segment: | Gearbox A |

| Property | Lower Bound | Upper Bound | Active Alarm | Active Alarm Style |
|---|---|---|---|---|
| Start Time | − 1 Day | + 2 Hours | Upper bound violation | High priority message |
| End Time | − | + 2 Hours | Upper bound violation | High priority message |
| Processing Time | − 10% | + 10% | Upper bound violation | Low priority message |
| Set-up Time | +2σ | +2σ | Upper bound violation | Low priority message |
| | | | | |

METHOD FOR UPDATING MANUFACTURING PLANNING DATA FOR A PRODUCTION PROCESS

CROSS-REFERENCE TO RELATED APPLICATION

This application claims the priority, under 35 U.S.C. §119, of European patent application EP 08 015 596.3, filed Sep. 4, 2008; the prior application is herewith incorporated by reference in its entirety.

BACKGROUND OF THE INVENTION

Field of the Invention

The present invention relates to a method for updating manufacturing planning data for a production process managed by a manufacturing execution system.

Industrial automation has increased in scope and refinement with time. In general, industrial automation has focused on continuous processes comprising a plurality of distributed and interacting manufacturing sites. This covers in particular a broad range of manufacturing execution systems allowing an integrated workflow which are offered by Siemens Corporation under its SIMATIC® product family. The virtue of that manufacturing design is that it provides adaptability to a varying product mix. A drawback is the resulting complexity of processes, management, and quality control.

Automatic manufacturing proves to be a data-and-information-rich structure. An elevated number of parameters may be required to merely describe the manufacturing process. Efficient management of the manufacturing planning data is thus imperative.

Manufacturing planning is the process that determines the estimated criteria of a production process. Production scheduling is derived from manufacturing planning and allocates resources for manufacturing. Often, the planning is a result of simple local planning policies that are evaluated at run-time (e.g. shortest job first, longest job first, first-in-first-out). Unfortunately, much of the input data for the manufacturing production process (hereinafter referred to as standard data) are typically quite unreliable, which in turn leads to rather unreliable production plans.

U.S. Pat. No. 5,444,632 and its European counterpart EP 0 679 972 A1 describe a systematic scheduler for manufacturing a multiplicity of items by process resources. To determine which lot to schedule next for a process resource, an evaluation is made from a set of selected lots and a set of selected process resources. Scores are assigned to each pairing of a lot and process resource. The pair with the best score determines which lot will be processed on which process resource.

Local scheduling is deterministic, conservative, and short-sighted. A wider perspective results from predictive scheduling. Predictive scheduling considers the integrated workflow and remains robust and valid even under a wide variety of different types of disturbance. However, unexpected local influences may render the predictive scheduling locally obsolete and lead to inefficiencies.

In combination with unreliable production planning data the mismatch of production planning data and the real production data very often lead to rather inefficient workflows on the shop floor level. In particular, the input data for off-line planning processes in the manufacturing environment is additionally impeding the accuracy of the production planning. Further, during off-line planning the input data is based on manual estimates or one-time data gathering. Furthermore, the input data is only occasionally updated based on similar unsatisfying measures.

SUMMARY OF THE INVENTION

It is accordingly an object of the invention to provide a method for updating manufacturing planning data for a production process which overcomes the above-mentioned disadvantages of the heretofore-known devices and methods of this general type and which provides for an update process that interacts with the current production process and allows to plan the production process more precisely.

With the foregoing and other objects in view there is provided, in accordance with the invention, a method for updating manufacturing planning data for a production process managed by a manufacturing execution system. The novel method comprises the following steps:

a) gathering data from a PLC level relevant to the manufacturing planning data and an execution of the production process;

b) mapping the gathered data to current manufacturing planning data in order to determine suggested changes between the gathered data and the current manufacturing planning data;

c) applying a predetermined update scenario for the manufacturing planning data depending on the suggested changes to form updated manufacturing planning data; and d) adapting the current production process and, optionally, following production processes in accordance with the updated manufacturing planning data.

The present invention therefore improves dramatically the reliability of the so-called standard data used in production planning processes. Furthermore, since trends on possible deviations from the standard data can be recognized in real-time, it is now possible to dynamically update the standard data as soon as an accompanying quality improvement programs reach those performance results which are significant for the current production plan based on the production planning data.

In order to achieve a very narrow relation between the real production process and the planned process, the step of gathering data comprises to monitor and store data stemming from execution rules initiated within the manufacturing execution system itself. Therefore, it is possible to gather the required information directly at run-time from the involved execution rules. The data achieved in this way is the most direct feedback from the shop floor level since in parallel with the scheduling of the respective execution rule a monitor function can be aligned which for example reports directly the time consumed from "Start of Execution" until "End of Execution". This direct feedback can be directly programmed with the execution rule and is therefore a process which now plays back the real circumstances into the future production planning process.

In another preferred embodiment of the present invention the automation of a direct reflection from the current process into the standard data can be foreseen by linking the gathered data from the execution of the production process during the execution to the manufacturing planning data. Therefore, any feedback from the shop floor level is registered directly with the production planning data which ensures the immediate use of this reflected data within future planning.

In another preferred embodiment of the present invention the step of mapping the gathered data comprises a statistical analysis of the gathered data to derive at a forecast indicating an impact of the current production process on the eventual properties of the production process. This feature enables the planning operator to consider the development of the relevant production parameters before an update scenario will be executed. In particular, this forecast is used to classify the current production planning data with respect to the present likelihood of occurrence in the current production process. This feature allows to estimate the probability of the occurrence of a distinct production process before any changes are effected. For example, under the assumption that a number of production events in a row are far beyond the planned production property this temporary occurrence must not indicate for sure that so far used production planning data is inaccurate and needs therefore to be updated. This can also mean that an equipment is worn and has to be checked or replaced by another equipment in order to retrieve the originally planned production data.

Since the automation of at least part of the update process, it might be appropriate when the predetermined update scenario is selected in dependency of predetermined thresholds for a difference between the current manufacturing planning data and the suggested changes derived from the gathered data. This feature opens a vast amount of reaction options in order to meet the required update reaction at an predictable and reliable scope. As for an example, the threshold can be designed according to the standard deviation which requires the production planning data to be updated when a certain threshold for the standard deviation (3sigma) is reached.

Furthermore, a computer program element can be provided, comprising computer program code for performing steps according to the above mentioned method when loaded in a digital processor of a computing device.

Additionally, a computer program product stored on a computer usable medium can be provided, comprising computer readable program code for causing a computing device to perform the mentioned method.

Other features which are considered as characteristic for the invention are set forth in the appended claims.

Although the invention is illustrated and described herein as embodied in a method for updating manufacturing planning data for a production process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a schematic representation of the defined corrective actions and thresholds of the production data;

DETAILED DESCRIPTION OF THE INVENTION

Figure 1:
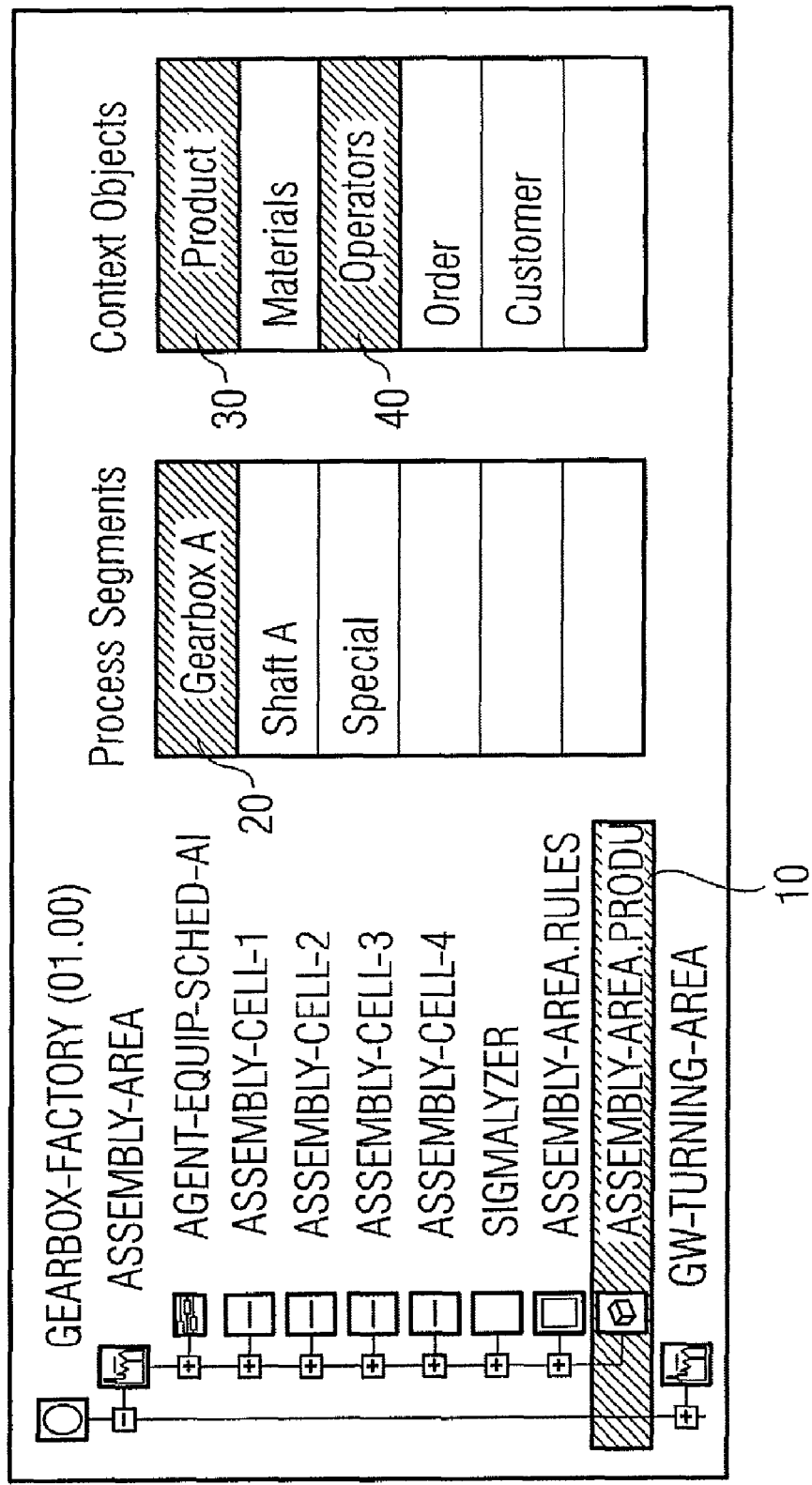
FIG. 1 is a schematic representation of the configuration of the exact production scheme.

Referring now to the figures of the drawing in detail and first, particularly, to FIG. 1 thereof, there is illustrated a schematic of the configuration of the exact production scheme. This configuration is a pre-requisite in the production planning process in order to enable the MES system to generate the required data for monitoring and statistically analyzing the gathered production data. For example, the user selects a production equipment 10, a process segment 20 and the value "products" 30 and "operators" 40 from among the context objects. To define this scheme in the production planning analyzer, the user can perform this selection typically by browsing a list of tags, parameters and properties as illustrated in FIG. 1. Each of this tags is either associated to a resource, a work order, product structure, a material or a combination of these objects. When the configuration is finalized, the production planning analyzer is planning the production process according to the parameters defined. For example, the current production planning data predicts for the assembly of the Gearbox A an operation time per unit of about 30 min. requiring a production equipment for about 20 min. and a human resource of about 10 min. all including an energy consumption of about 2 kW.

As illustrated in the schematic representation of FIG. 2, the user subsequently has to define the corrective actions and thresholds relevant for the monitoring of the production data in order to trigger alarms to the responsible users or components. These thresholds could be set using the standard deviation (e.g. 3-sigma) or an absolute value(e.g. <2 days lateness). Thereby, the user is allowed to prioritize distinct criteria over others, such as for example the starting time and ending time of the defined production process with respect to an upper bound violation. The process for updating the production planning data is now made sensitive for the data necessarily to be gathered and monitored/evaluated.

Figure 3:
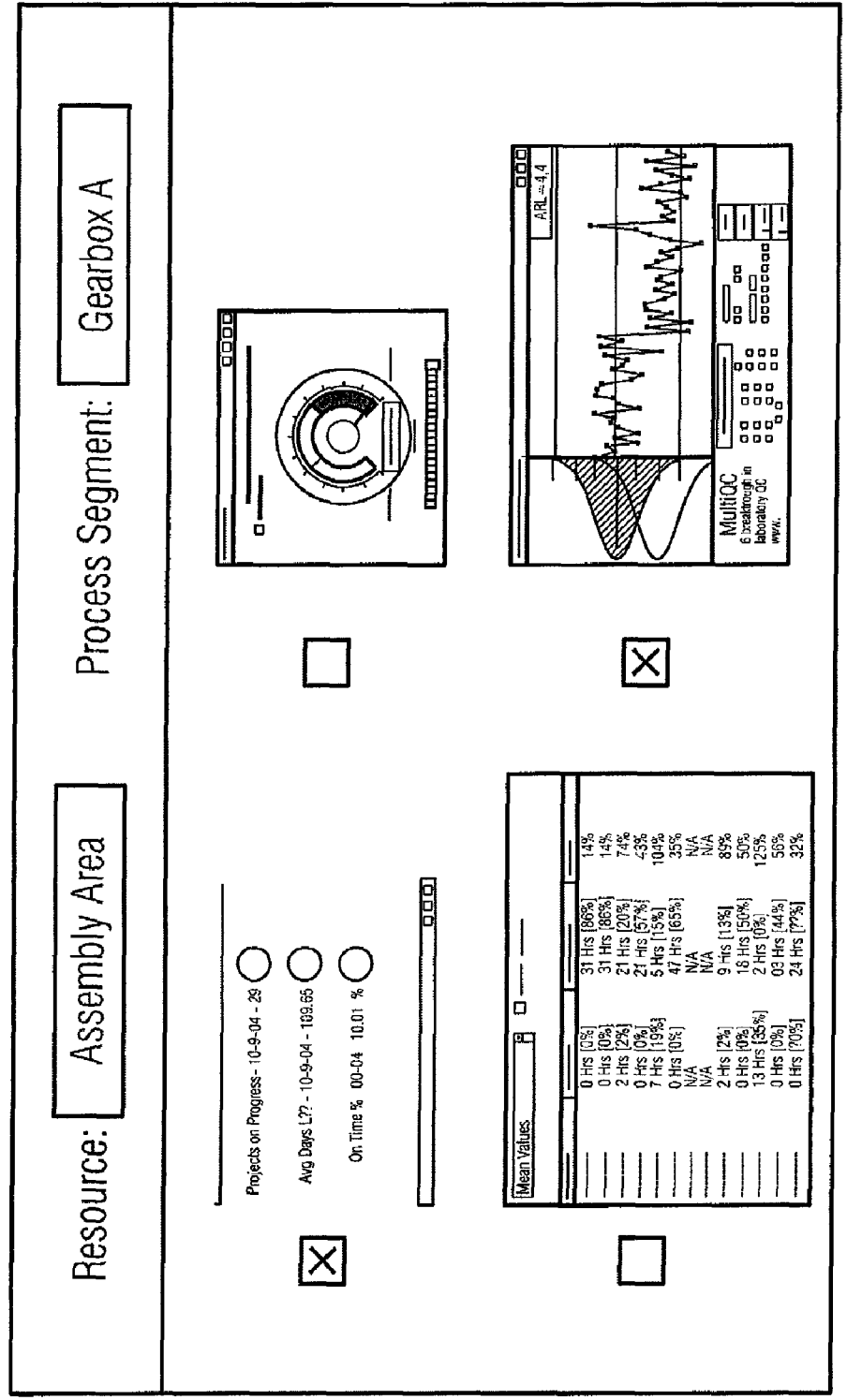
FIG. 3 Is a schematic representation of the selection of an appropriate display chart.

Once the user has defined the corrective actions and thresholds, he can now optionally select the kind of display charts which will display the gathered data in order to achieve the intuitive overview of the current production data as compared to the planned production data. FIG. 3 illustrates schematically a representation of different display charts which the user can select to monitor and analyze the production data. Available charts in FIG. 3 are histograms, mean and standard deviation trend graphs, Shewhart charts or just simple "traffic light" control.

Figure 4:
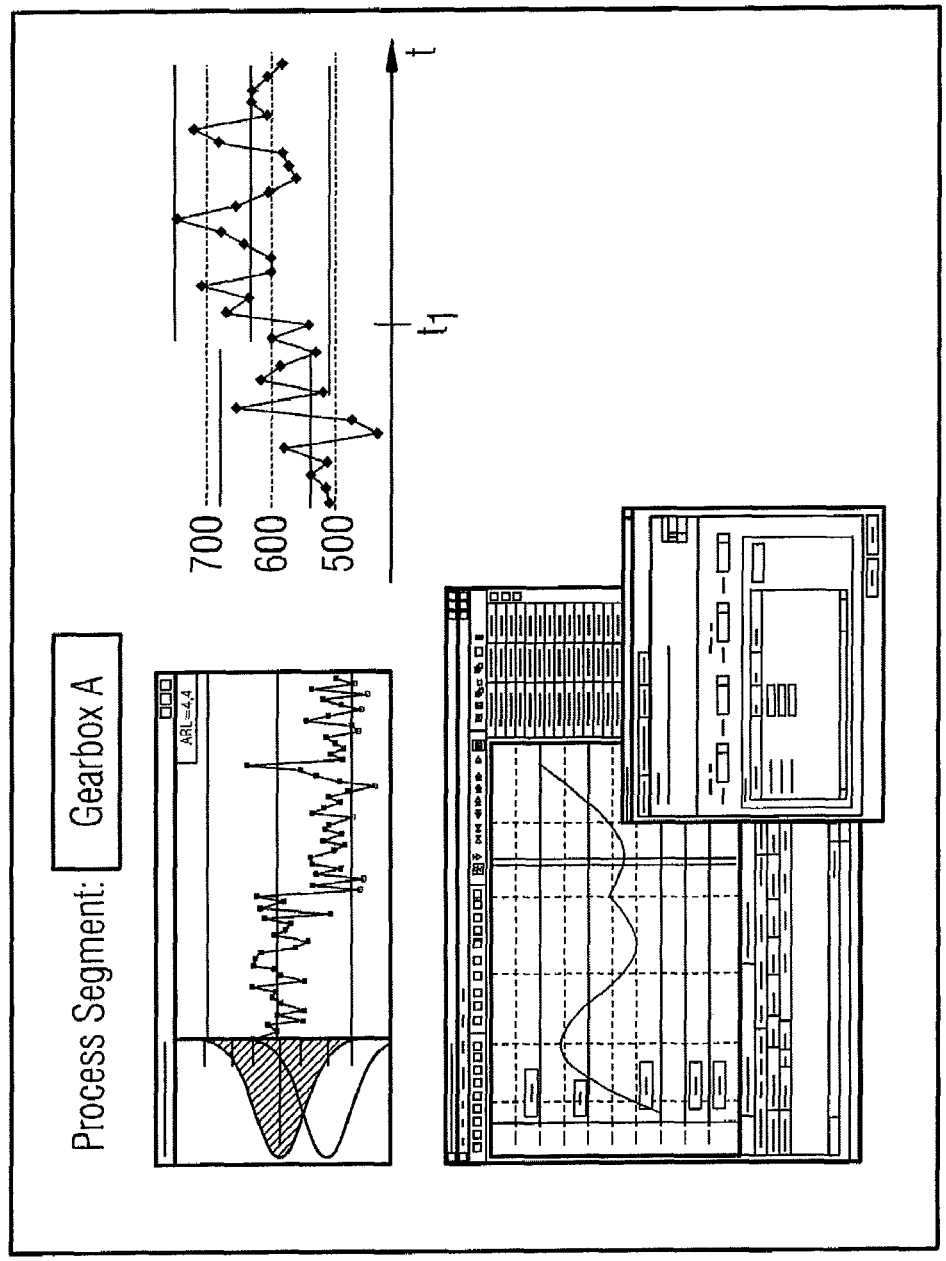
FIG. 4 is a schematic representation of the charts displaying the currently gathered production data based on the user-defined sampling and calculation strategy.

FIG. 4 now illustrates a schematic representation of the Shewhart chart for the process segment of the gearbox A. These charts are updated according to the sampling and calculation strategy defined by the user. As inherent to the Shewhart chart, the gathered data is used to calculate both the sliding average and the 3 sigma deviation over a period of predetermined sampling cycles. The user is enabled to identify potential bad samples and optionally, he can confirm bad samples by marking them. Threshold violations are therefore highlighted in the charts and also in the accompanying tables. The Shewhart chart of FIG. 4 shows on the right a chart having an average value that is increased at a point $t_1$ with the time following the trend of the most recently gathered data. The production process analyzer and/or the user can based on these graphically displayed information decide to identify structural deviations and trends (by using a moving average functionality). The user can subsequently adjust the default and threshold values. The scenario for an update of the production planning data is then derived depending on these deviations and trends.

Figure 5:
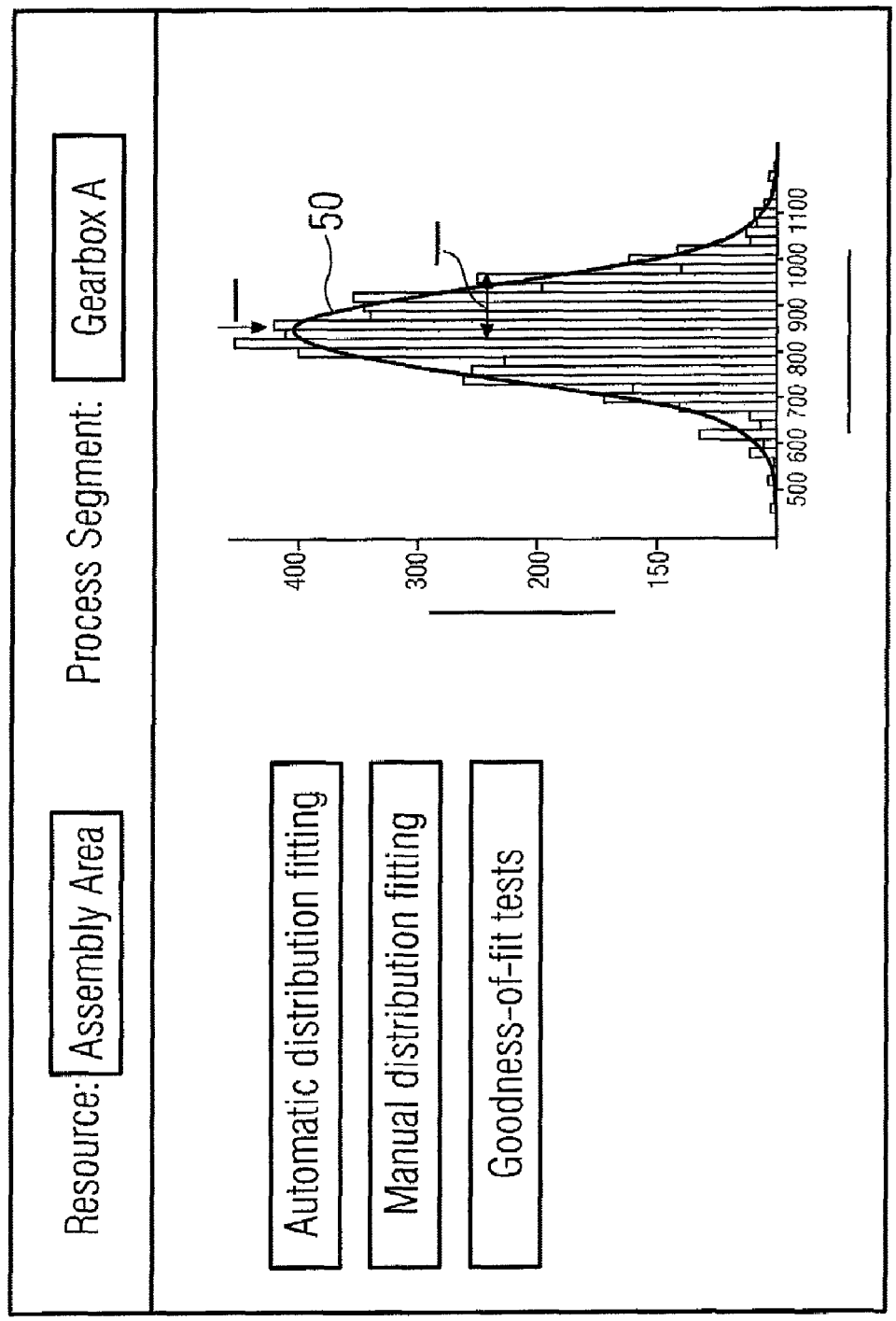
FIG. 5 is a schematic representation of a distribution fitted to the gathered data.

FIG. 5 illustrates a schematic representation of a distribution 50 fitted to the gathered data. To select the best fit, multiple fits on various candidate distributions can be performed and goodness-of-fit test can be applied in order to identify not only the new production planning data itself but also to identify the new thresholds and 3-sigma values.

In the particular example of FIG. 1, it is for example possible that the process for producing the gearbox A is increasingly consuming time and electrical power, for example due to wear in an assembling unit. Therefore, the production planning data can be updated in order to reflect these time increase accordingly when planning the next production processes as well as the production planning data can be used for maintenance purposes by requiring a maintenance operation when a predetermined maximum value for the production time is reached.

By updating the production planning data in situ (dynamically) the production planning analyzer immediately reflects any change in the production planning data by adjusting the production processes. For the production scheduler, this adjustment may for example also help to schedule the production process more realistically, in particular when the updated production planning data is directly evaluated by the production scheduler in order to update the production schedule itself. Since these processes are now preferably automatically implemented within the manufacturing execution system, the production plan and the processes relying on the production plan are more precise thus adjust the production process to the existing production environment and parameters.

Figure 6:
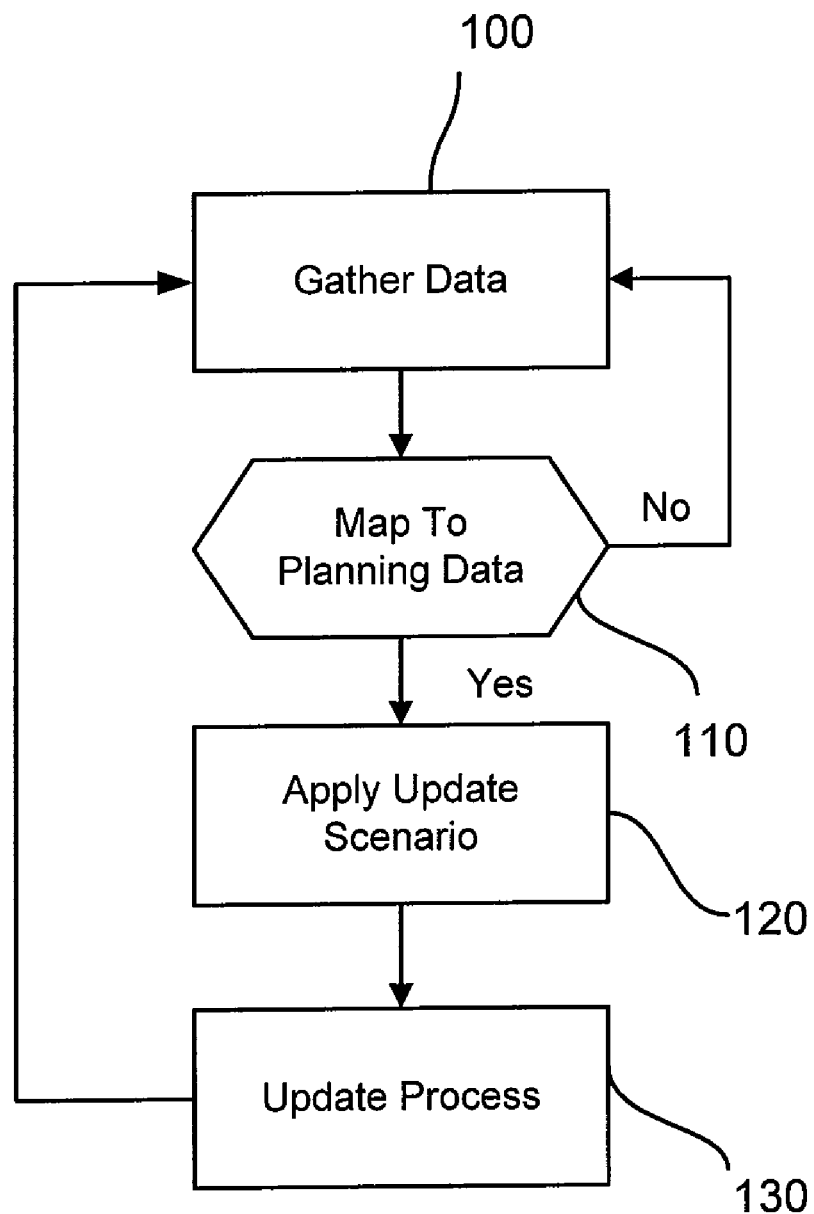
FIG. 6 is a schematic of an updated production process.

FIG. 6 is a schematic summarizing the primarily important process steps according to the present invention when updating manufacturing planning data for a production process managed by a manufacturing execution system. At 100, data from a PLC level relevant to the manufacturing planning data and the execution of the production process gathered from the shop floor level. At 110 the gathered data is mapped with the current manufacturing planning data in order to determine suggested changes between the gathered data and the current manufacturing planning data. In case that the conclusion from this step is not to suggest change the process goes back to step 100. In the case of a determination of a suggested change, at 120 a predetermined update scenario for the manufacturing planning data is applied, thereby depending on the suggested changes to update the manufacturing planning data which were determined in at 110. Finally, at 130 the current production process and optionally following production processes are adjusted in response to the updated manufacturing planning data and the process now returns to 100.

The invention claimed is:

1. A method for updating manufacturing planning data for a production process managed by a manufacturing execution system, the method which comprises the following method steps:
   - gathering data from a PLC level relevant to the manufacturing planning data and an execution of the production process; and thereby monitoring and storing dated stemming from execution rules inplemented in a manufacturing execution system at run-time;
   - mapping the gathered data to current manufacturing planning data in order to determine suggested changes between the gathered data and the current manufacturing planning data;
   - applying a predetermined update scenario for the manufacturing planning data depending on the suggested changes to form updated manufacturing planning data, and deriving a forecast indicating an impact of suggested changes on the production process; and
   - adapting the current production process only if the forecast indicated a given probability of the occurrence of a distinct production process and, optionally, following production processes in accordance with the updated manufacturing planning data.

2. The method according to claim 1, which comprises linking the gathered data from the execution of the production process during the execution to the manufacturing planning data.

3. The method according to claim 1, wherein the step of mapping the gathered data comprises subjecting the gathered data to a statistical analysis to derive at a forecast indicating an impact of the current production process on eventual properties of the production process.

4. The method according to claim 1, which comprises selecting a predetermined update scenario in dependence on predetermined thresholds for a difference between the current manufacturing planning data and the suggested changes derived from the gathered data.

5. A manufacturing execution system with a plurality of distributed and interacting manufacturing sites, wherein the manufacturing sites are equipped for production processes and configured to update manufacturing planning data by the method according to claim 1.

6. A computer program product stored in non-transitory form and carrying a computer program adapted to perform the method according to claim 1 on one or more computers having the computer program loaded into memory.

7. A computer readable medium, comprising a computer program in computer-executable code stored in a non-transitory form and which, when loaded onto a computer, executes the method according to claim 1.

* * * * *

UNITED STATES PATENT AND TRADEMARK OFFICE
CERTIFICATE OF CORRECTION

| | | |
|---|---|---|
| PATENT NO. | : 8,306,645 B2 | Page 1 of 1 |
| APPLICATION NO. | : 12/553685 | |
| DATED | : November 6, 2012 | |
| INVENTOR(S) | : Mark Mathieu Theodorus Giebels | |

It is certified that error appears in the above-identified patent and that said Letters Patent is hereby corrected as shown below:

Column 6, Claim 1

Lines 21, "indicated" should read -- indicates --

Signed and Sealed this
First Day of January, 2013

David J. Kappos
*Director of the United States Patent and Trademark Office*